United States Patent [19]
Bosch et al.

[11] Patent Number: 5,220,575
[45] Date of Patent: Jun. 15, 1993

[54] ELECTRODE FOR PULSED GAS LASERS

[75] Inventors: Wolfgang Bosch, Lahstedt; Thomas Bregel, Remchingen-Nöttingen; Joachim Ganz, Unterreichenbach-Kapfenh; Roland Michal, Pforzheim; Karl E. Saeger, Pforzheim; Ludwig Scheiner, Pforzheim; Franz Prein, Neckargemünf-Waldhilsbach; Jürgen Wiegand, Eppelheim, all of Fed. Rep. of Germany

[73] Assignees: Doduco GmbH + Dr. Eugen Durrwachter, Pforzheim; Eltro Gaselischaft fur Strahlungstechnik, Heidelberg, both of Fed. Rep. of Germany

[21] Appl. No.: 623,955

[22] PCT Filed: Apr. 2, 1990

[86] PCT No.: PCT/EP90/00516

§ 371 Date: Dec. 4, 1990

§ 102(e) Date: Dec. 4, 1990

[87] PCT Pub. No.: WO90/12434

PCT Pub. Date: Oct. 18, 1990

[30] Foreign Application Priority Data

Apr. 4, 1989 [DE] Fed. Rep. of Germany ....... 3910773

[51] Int. Cl.$^5$ .............................. H01S 3/038
[52] U.S. Cl. .................................... 372/87
[58] Field of Search ............. 372/87, 33, 55, 56, 372/61; 313/34, 633

[56] References Cited

U.S. PATENT DOCUMENTS

| | | | |
|---|---|---|---|
| 3,591,822 | 7/1971 | Katz | 313/311 |
| 3,753,024 | 8/1973 | Vicai | 313/633 |
| 4,101,846 | 7/1978 | Fein et al. | 372/87 |
| 4,122,411 | 10/1978 | Fein et al. | 372/87 |
| 4,415,835 | 11/1983 | Mishra et al. | 313/633 |
| 4,636,681 | 1/1987 | Misumi | 313/311 |
| 4,875,218 | 10/1989 | Hongo et al. | 372/87 |
| 4,890,035 | 12/1989 | Prein et al. | 313/633 |
| 4,956,848 | 9/1990 | Terai et al. | 372/87 |

FOREIGN PATENT DOCUMENTS

59-227183 12/1984 Japan.
63-204676 12/1988 Japan.

OTHER PUBLICATIONS

Smith et al., "Cathode Materials for Sealed $CO_2$ Waveguide Lasers", IEEE Journal of Quantum Electronics, vol. 19, No. 5, May 1983, pp. 815–820.

Arutyunyan et al., "Electrode Effects in a Pulse-Periodic Excimer Laser", Soviet Journal of Quantum Electronics, vol. 16, No. 12, Dec. 1986 pp. 1589–1592.

Kanter et al., "Surface Metallization Studies for Excimer Laser Electrodes" Thin Solid Films, vol. 63, Apr. 1979, pp. 119–120.

Primary Examiner—Georgia Y. Epps
Attorney, Agent, or Firm—Dvorak and Traub

[57] ABSTRACT

The electrode consists of a metal carrier (1) and a surface layer (3), which has been deposited on the carrier and has a thickness of 0.1 to 20 μm and consists of a material which differs from the carrier material and distinguishes from the carrier material by having a smaller work function and lower thermal and electrical conductivities and is selected from the group tungsten, niobium, tantalum, rhenium and chromium. The carrier (1) consists of a deeply drawable material. There is preferably also an interlayer (2) made of a highly conductive metal.

32 Claims, 1 Drawing Sheet

ELECTRODE FOR PULSED GAS LASERS

This invention relates to an electrode having the features recited in the prior art part of claim 1.

Gas discharge chambers employed in pulsed gas lasers, such as $CO_2$ lasers or Excimer lasers, contain two mutually opposite electrodes, which are parallel to the optical axis and between which the electric discharges take place by which the gas enclosed in the gas discharge chamber is excited to emit the laser radiation. In pulsed operation, typical gas lasers may produce pulse powers of a few megawatts and more, the pulse width is typically of an order to 50 ns and the electrode surface area amounts to some 10 $cm^2$. The highest pulse powers are achieved with Excimer lasers. The gas filling of typical Excimer lasers contains 5 to 10% of an active noble gas, such as krapton, 0.1 to 0.5% of a halogen gas, particularly fluorine or chlorine, and a lightweight buffer gas, such as helium or neon, under a total pressure from $1.5 \times 10^5$ to $4 \times 10^5$ $N/m^2$.

Various requirements are to be met by the electrode in gas discharge chambers of gas lasers. The basic requirement resides in that the electrodes must be particularly suitable for an emission of electrons which permit a diffuse glow discharge, which should spread as uniformly as possible over the electrode surface which is available. In known gas lasers having a gas atmosphere which contains electronegative components, such as oxygen in $CO_2$ and CO lasers or fluorine and chlorine in Excimer lasers, it is often observed that the gas discharge, in most cases during its late phase, suddenly changes from a glow discharge to an arc discharge. This is due to the fact that electrons made available by the preionizing means become attached to the electronegative atoms or molecules and are then no longer available for the discharge process. If the cathode cannot supply a sufficient number of make-up electrons the discharge will suddenly change. Such arc discharges have numerous disadvantages. In the first place, arc discharges do not contribute to the laser process so that the pulse rate will highly be reduced. Besides, they will increase the electrode erosion. This will result in a roughening of the surface of the electrode and in a change of its profile. On the other hand, a considerable part of the electrode material which has been removed will deposit on the windows of the discharge chamber. The cleaning of the windows cannot be performed in enclosed lasers and is highly expensive in nonenclosed lasers.

Because individual arc discharges cannot entirely be prevented, the tendency of the electrode material to sputter must be as low as possible. Besides, the material is required to have a high electrical conductivity in order to ensure that the voltage pulse which is applied will spread as quickly as possible throughout the surface of the electrode.

Another requirement to be met by the electrode material is that the thermal conductivity should be as high as possible so that an occurrence of hot spots on the electrode at high pulse repetition rates will be prevented. Such hot spots may consist of the roots of arc discharges and may burn in. Finally, chemical reactions on the electrode surface play a significant role. A strong local heating of the gas may result in dissociations and chemical transformations in the gas and may change its properties. For instance in a $CO_2$ laser which in its gas discharge chamber contains a gas consisting of $CO_2$ and smaller proportions of nitrogen and helium under a pressure of $1.0 \times 10^5$ to $1.5 \times 10^5$ $N/m^2$ there may be a dissociation of $CO_2$ with formation of an extremely reactive oxygen, which may react with the material of the electrode or of the chamber walls or may react with the nitrogen contained in the gas filling so that nitrogen oxides are formed, which are electronegative and consume electrodes from the discharge. For this reason the electrodes in a $CO_2$ laser must be as passive as possible relative to the gases filling the gas discharge chamber so that neither the filling gases nor the electrode surface can undergo a chemical transformation by interacting and it is also essential for the electrodes to be highly compatible with oxygen, which means that there should be no arc flashovers in the gas discharge chamber until the highest possitive oxygen partical pressure.

Because the laser gas interacts with the electrode surface and with sputtered electrode material during the gas discharges and because sputtered electrode material deposits on the windows of the laser chamber, the material of the laser electrodes will not only determine the life of the electrodes, the shape of which is changed as they are consumed, but will also determine the life of the laser gas and of the optical system of the laser. But for a use of lasers in industrial manufacture it is important that the maintenance intervals are as long as possible. A typical Excimer laser which is filled with argon and fluorine gases will require after about 2000 operating hours a maintenance by which the gas filling is renewed and the windows are cleaned. This results in considerable downtimes not only owing to the duration of the maintenance work proper but also because the electrodes must again be passivated whenever the gas filling has been renewed. the passivating time is increased by each change of gas. The passivating time is the time which must elapse before the rated output power is reached after a change and in dependence on the electrode material is between 1 hour and 2 days.

In order to ensure that the gas discharge between the electrodes will be as uniform as possible, it is known to use electrodes having a Rogowski profile. But experience has shown that this will not preclude in itself the formation of discharge zones having different energy densities.

DE-A-36 42 749 discloses electrodes which in their surfaces contained various juxtaposed finely divided substances so that the gas discharge will be as uniform as possible and the life will be as long as possible. For instance, a base substance having a high electrical conductivity, such as copper, may include particles which have a size of 0.1 to 100 $\mu m$ and consist of different material, which has a lower work function. The surface of such electrodes thus has a heterogeneous composition, which will promote the emission of electrodes by a stronger electric field emission resulting from a local increase of field strength.

In general, the various requirements to be met by the electrodes are not compatible with each other. At present, electrodes of nickel or brass are used in most cases for Excimer lasers. Nickel-plates aluminum electrodes are known too (DE-A-38 17 145). Brass electrodes typically have a life of 4000 operating hours. Nickel electrodes are customary for $CO_2$ lasers. Electrodes made of tungsten, aluminum, special steel, iridium, gold or platinum have also been proposed (W. J. Witteman, "The $CO_2$ laser", Springer-Verlag 1987, page 105) but all of them have certain disadvantages. Materials having a high electrical conductivity, such as gold, platinum, silver, copper and aluminum, do not have a particularly high electron emissivity and their resistance to various filling gases is sometimes not particularly high; besides, they have high sputtering rates. Whereas transition metals such as molybdenum and tungsten have a favorable electron emissivity, they have a poor electrical conductivity and can be shaped only with high difficulty (the manufacture of a tungsten electrode for a $CO_2$ high-power laser would take about one week so that that method is no practical alternative).

It is an object of the present invention to provide electrodes for pulsed gas lasers, which electrodes permit an even more uniform diffuse discharge and result in a longer life of the gas filling and of the electrodes themselves and can be manufactured without substantial difficulty although the electrode dimensions are as large as is required for gas lasers (electrode surface area up to some $dm^2$ and electrode length of an order of 1 meter).

That object is accomplished by electrodes having the features recited in claim 1. A desirable process of manufacturing such electrodes is recited in claim 13. Desirable developments of the invention are covered by the dependent claims.

The electrodes in accordance with the invention embody a combination of features, some of which have been known before but which is their combination result in electrodes having unexpectedly favorable properties. For instance, it has been found that tungsten-coated copper electrodes in $CO_2$ lasers tend to exhibit are flashover only at an oxygen partial pressure which is 4 times as high as that employed with the nickel electrodes which are conventionally used and which are inferior to tungsten-coated copper electrodes also as regards electron emission, uniformity of the gas discharge, and life.

In a departure from the teaching of DE-A-36 42 749 the electrodes in accordance with the invention have a homogeneous surface layer, the composition of which is so selected that it will be compatible with the gas atmosphere in which they are intended to operate, that its consumption in that gas atmosphere is minimized and that its electron emissivity is as high as possible under such restricting conditions.

In accordance with the invention the thickness of the surface layer should not exceed 20 μm. For this reason it is not necessary in the selection of the material of the surface layer to pay special attention to its electrical conductivity. On the contrary, the electrical conductance required for making available the pulse energy for a short time can be ensured by the selection of the carrier material and/or by the selection of the material for any interlayer which is provided. Besides, the carrier material is selected essentially only from two aspects, namely, from the aspect of easy shapeability of the material (it is required to be deeply drawable) and from the aspect of resistance to corrosion by the laser gas. The resistance to corrosion will be important if—as is suitable—the coating is effected only on the active electrode surface so that the carrier is not completely protected. A supplemental criterion for the selection may be the thermal conductivity if there is no highly heat-conducting interlayer and the heat generated by the gas discharge must be distributed and dissipated by the carrier. The lower the temperature at which the electrode surface can be kept owing to a high thermal conductivity of the interlayer or—in the absence of such layer—of the carrier, the smaller will be the consumption (sputtering rate) in operation. The smaller the consumption, the less electrode material may be deposited on the windows of the laser chamber so that the life is increased and the maintenance intervals become longer. A result in the same direction will be produced by a highly heat-conducting interlayer or—in the absence of such layer—by a highly heat-conducting carrier also because the high thermal conductivity is accompanied, as a rule, by a high electrical conductivity, which will promote more uniform discharges and will thus reduce the tendency to produce arc discharges. Whereas a decrease of the surface temperature will reduce the electron emissivity, this will be no disadvantage because in the laminated electrode in accordance with the invention the surface may be constituted by a material having a high electron emissivity, particularly tungsten. An exception is constituted by the Excimer fluoride laser, in which tungsten cannot be used as an electrode material because the easily vaporizable $WF_6$ will be formed, which will contaminate the windows of the discharge vessel. If a material having a lower conductivity is selected for the interlayer or—in the absence of such interlayer—for the carrier, it will be possible to effect a temperature rise of the electrode to a higher temperature if this is desired in order to promote the electron emission. Because the requirements to be met by the electrode are fulfilled in part by the selection of the material of the cover layer and optionally also by the selection of the material of an interlayer, optimum progressive electrode structures for various types of lasers can be obtained. As regards chemical compatibility, virtually all materials recited in claim 1 can be used for the surface layer in $CO_2$ because the $CO_2$ laser does not contain aggressive gases. Such materials exhibit only a slow reaction with the reactive oxygen which is produced by dissociations. Tungsten, which has been mentioned hereinbefore, is particularly suitable.

In chloride-containing Excimer lasers the refractory materials mentioned hereinbefore are also particularly suitable for the surface layer. In fluorine-containing Excimer lasers, the surface layers may consist of chromium, tantalum and rhenium.

In conclusion, the advantages afforded by the new electrode reside in that the material selected for the electrode surface, the composition of which is decisive for the electron emissivity and for the consumption, is optimum regarding the electron emissivity and the consumption in the gas atmosphere which is determined by the type of the laser whereas the disadvantages of the chosen material as regards its conductivity and shapeability will be avoided. Because said materials can be shaped only with difficulty their use will not be economically practicable in view of the requirements to be met by the shape and size of the electrodes unless said materials are applied as a thin layer to an easily shapeable carrier, which has previously been given the shape that is desired for the electrode. The selection of the material for the carrier and/or of an interlayer provided thereon will afford the advantage that the lower electrical and thermal conductivities of the carrier and/or the interlayer provided that—as is claimed—the average thickness of the surface layer does not exceed a predetermined upper limit.

Investigations have shown that cathodes made in accordance with the invention distinguish distinctly from electrodes which have been made in accordance with the prior art: Hot spots occur much more frequently on cathodes in accordance with the invention but they distinctly have no lower intensity and they have a very homogeneous distribution so that the lasers have a much longer life and maintenance interval. Besides, the reduced tendency to exhibit are discharges will afford the advantage that wider laser pulses may be employed.

Materials which are particularly suitable for the carrier include copper, aluminum, brass, tin bronze and steel, especially special steel. The carriers are made from said materials by deep drawing. Even through the electrode surface consists of a material which can be shaped only with difficulty, this will be the simplest method of achieving electrodes having the desired shapes. Thereafter it will be sufficient to provide a thin coating on the carriers, whereas the latter need no longer be shaped. This is a great advantage over electrodes consisting of materials such as copper-tungsten (DE-A-38 17 145) because it is very difficult to manufacture such electrodes having the required dimensions.

The surface layer should have thickness of at least 3 $\mu$m so that it cannot be punctured under the influence of an arc discharge. Preferably it s thickness is only between 5 and 10 $\mu$m so that the achievement of a uniform distribution of the glow discharge and heat dissipation form the surface layer is less dependent on the relatively high electrical and thermal conductivities of said layer but can be promoted by the higher conductivity of the material under the surface layer.

On principle, the surface layer may lie directly on the carrier, particularly if the carrier consists of copper or another material which can be deeply drawn and has high electrical and thermal conductivities. It is preferred, however, to provide between the carrier and the surface layer an interlayer which consists of a metal which has higher electrical and thermal conductivities than the surface layer and preferably also of the carrier. This will increase the scope for the selection of the material of the carrier and will permit the selection of the interlayer only with a view to high electrical and thermal conductivities so that it may particularly consist of copper. Alternatively the interlayer might consist of aluminum or silver or silver-copper. The thickness of the interlayer should be at least 5 $\mu$m so that it can accomplish its object to uniformly distribute the electric current and heat over the electrode surface. For technical reasons (occurrence of an inherent stress in the layer resulting in a lower adhesion to the carrier) the thickness of the layer should not exceed 20 $\mu$m; a thickness of 10 $\mu$m is entirely satisfactory.

It is preferable to take care that the transition from the interlayer to the surface layer is gradual rather than abrupt. Such a gradual transition from the interlayer to the surface layer may be achieved, e.g., in that the material for both layers is deposited by a PVD process, targets made of both materials are provided in the deposition chamber and, while the vacuum in the deposition chamber is maintained, the materials for the interlayer and the surface layer are deposited in alternation in such a manner that the material for the surface layer is deposited at a progressively increasing rate and finally only the material for the surface layer is deposited. Such a continuous transition will afford the advantage that the bond strength of the surface layer will be improved and that less material will be sputtered in the operation of the laser. Such a continuous transition will also make sense and will be advantageous if the same material is chosen for the interlayer and for the carrier in order to provide a continuous transition from the carrier to the surface layer, particularly if a material having high electrical and thermal conductivities has been selected for the carrier (e.g., copper may be used for an interlayer on a copper carrier and may be succeeded by a surface layer, e.g., of tungsten).

A process that is particularly suitable for the manufacture of electrodes in accordance with the invention is the subject matter of claim 13. In accordance therewith it is preferred first to make the carrier in the final shape intended for the electrode. The carrier might be massive but is preferably a profiled member which is made by deep drawing. It will then be sufficient to coat the thus prepared carrier. The material for the surface layer is deposited in accordance with the invention by physical vapor deposition from the gas phase. The physical vapor deposition will afford the advantage that the surface layer will have the same shape as the surface of the carrier; the surface profile of the carrier is not leveled by the physical vapor deposition.

Because the surface profile of the carrier is not leveled by the physical vapor deposition it is possible to use carriers having a microrough surface for the electrodes, which surface will be preserved in spite of the coating and will promote the emission of field electrons. For this reason the surface layer need not be aftertreated in order to provide a defined microroughness; this will afford the further advantage that the electrode surface will not suffer a contamination, which would have to be removed by an after-treatment. On the other hand, electrode surfaces of high purity are of high importance for the operation of a gas laser.

The surface layer may homogeneously be deposited from one of the metals recited in claim 1; alternatively, blends made of said metals may be deposited so that optimum surface properties may be achieved.

One interlayer or a plurality of interlayers may be provided and may basically be applied to the carrier by any desired process, for instance, by electrodeposition or mechanical cladding. But any interlayer will preferably be formed by physical vapor deposition, which will afford the advantage that undesired substances will not enter the layers, which will remain pure, and that the profile of the surface of the carrier will not be leveled. The total thickness of the layers applied to the carrier should not be in excess of 50 $\mu$m.

Magnetron sputtering is a particularly desirable deposition process; in that case a magnetic field is superimposed on the electric field of the glow discharge. The resulting increase of the sputtering rate will permit relatively thick and uniform layers to be more economically produced.

Before the electrodes in accordance with the invention are used in the gas discharge chamber they are preferably conditioned to stabilize their properties. Said conditioning is effected in a gas atmosphere which has the same components as the atmosphere in which the electrodes are intended to be used, or which contains at least those of said components which are essential for the stabilization of the electrodes, i.e., for an Excimer laser at least the halogen, for a $CO_2$ laser carbon dioxide and/or carbon monoxide and/or oxygen, for a CO laser carbon monoxide and/or oxygen, for nitrogen lasers nitrogen and/or oxygen; see claims 18 to 22, in which those metals are also stated for the surface layer which are particularly suitable for the intended purpose. Said gases in which the conditioning is effected need not be present in the same concentration as in the gas discharge chamber of the laser but the composition of the gas atmosphere and the concentration of its components may be so selected that they will be most favorable for the fastest possible stabilization of the electrodes. As a rule, the selected concentrations of the components required for the stabilization will be higher than in the gas discharge chamber of the laser. The gas pressure applied for the conditioning may also be quite different from the gas pressure applied in the intended use of the electrodes. Because the conditioning is already effected in the coating chamber, it may be faster than in a laser chamber. A further advantage resides in that the burn-in process otherwise to be performed in the laser chamber can be omitted; in dependence on the type of the laser that process may require 100,000 pulses.

In the course of the conditioning process, a passivating layer is formed in the surface layer. That passivating layer contains components of the gas in which the conditioning has been effected and said components are partly physically and partly chemically bound to the atoms of the metal used for the surface layer. For instance, the conditioning of a tungsten layer in a laser having an atmosphere of carbon dioxide, carbon monoxide or oxygen will result in the formation of a passivating layer which contains various tungsten oxides, beginning with WO in the depth and comprising upwardly increasing contents of $WO_2$ and $WO_3$. Similarly, nitrides may form in a nitrogen-containing atmosphere. The passivating layer is important for the performance of the laser. The passivated surface has a lower work function than the purely metallic surface. The thickness of the passivating layer depends on the duration of the treatment in the gas and should preferably amount to about 100 nm.

In both cases the electrodes are elongate. In the example shown in FIG. 1 the carrier 1 consists of a massive part which is made of a deeply drawable metal and which on its rear side, on which a coating is not required, is defined by a planar surface, e.g., a cylindrical surface, which carries an interlayer 2 and on the latter a surface layer 3, from which the electrons required for the gas discharge are emitted.

Figure 2:
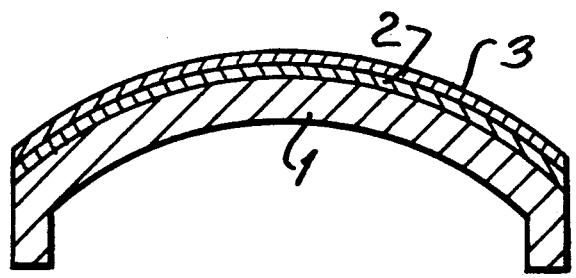
FIG. 2 is a transverse sectional view showing another electrode, which comprises a carrier that has been formed by deeply drawing a sheet metal element.

The electrode shown in FIG. 2 has basically the same laminated structure but instead of a massive carrier has a relatively thin carrier, which has been formed by deep drawing from a sheet metal element and for this reason has a concave rather than a planar rear surface.

ILLUSTRATIVE EMBODIMENTS

Example 1

Figure 1:
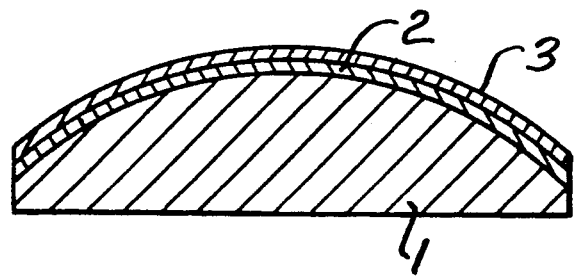
FIG. 1 is a transverse sectional view showing a massive electrode.

The electrode comprises a copper carrier which has the shape illustrated in FIG. 1 and is provided with a tungsten surface layer, which has a thickness of 3 $\mu$m and has been deposited onto the carrier by sputtering. There is no interlayer. The electrode is conditioned in that it is subjected to electric discharges in a high-helium atmosphere, which contains carbon monoxide, while gas pressures, discharge voltages and electric currents are maintained which are lower than under the conditions maintained in a $CO_2$ laser.

Example 2

An electrode is made which comprises a carrier consisting of a deeply drawn copper sheet, as is shown in FIG. 2. That carrier is coated and conditioned as in Example 1.

Example 3

An electrode is made which comprises a carrier that is made of special steel and has the shape shown in FIGS. 1 or 2. By physical vapor deposition, a copper interlayer having a thickness of 5 $\mu$m and subsequently a tungsten surface layer having a thickness of 3 $\mu$m are deposited onto that carrier by physical vapor deposition. The electrode is conditioned as in Example 1 but the atmosphere contains some oxygen as an additional component.

The electrodes of Examples 1, 2 and 3 can be used in $CO_2$ lasers.

Example 4

An aluminum carrier 1 having the shape shown in FIGS. 1 or 2 is provided with a chromium layer having a thickness of 3 $\mu$m in order to form an anode for an Excimer ArF laser. Coating is effected by a PVD process. There is no interlayer.

Example 5

An electrode is made which has a carrier consisting of aluminum or special steel. The carrier has the shape shown in FIGS. 1 or 2. A copper interlayer having a thickness of about 8 $\mu$m is applied to said carrier by magnetron sputtering. Without a change of the vacuum in the deposition chamber, a tungsten layer having a thickness of about 10 $\mu$m is then applied to the interlayer. Care is preferably taken to provide a continuous, transition from the copper interlayer to the tungsten surface layer in order to improve the adhesion and sputtering rate of the latter.

The electrode is conditioned in a gas mixture which preferably contains $CO_2$ and $O_2$, particularly 30% $CO_2$ and 1 to 2% $O_2$, also nitrogen and/or helium, under a gas pressure (e.g., 0.5 to 0.8 bar) which is lower than in laser operation. A glow discharge or a pulsed electric discharge between two electrodes or between an electrode and an auxiliary conductor is effected in the coating chamber, preferably immediately after the coating layer has been formed. That glow discharge or pulsed discharge is struck at a voltage which in dependence on the gas pressure is lower than the voltage in the gas discharge chamber of the laser.

The conditioning is performed until the tungsten layer has been oxidized to a depth of about 1000 Angströms. A passivating layer having that thickness will ensure a stable discharge in use in a CO or $CO_2$ laser, particularly under a high gas pressure (1 bar and more). That thickness of the layer will be achieved after about 50,000 shots if the conditioning is effected under a gas pressure of 0.8 to 1 bar and in gas volume of about 500 ml and with an electrical energy density of about 0.3 J per $cm^2$ of the discharge surface area (effective electrode surface area).

The same result can be achieved under lower pressures and by an application of correspondingly lower voltages if longer operating times are employed. An orientation is furnished by the total electrical energy which is coupled in through the electrode surface (about 15 kJ/$cm^2$ for a layer having a thickness of about 10 μm). Passivating oxide layers having much smaller thicknesses may result in changing gas mixtures, i.e., in changing properties of the laser. Passivating oxide layers having much larger thicknesses may result in poorer discharges and in unstable conditions in the laser.

For Excimer lasers, halogen layers rather than oxide layers are formed by corresponding techniques.

Example 6

Example 5 is modified in that the conditioning is effected in a gas mixture which contains 10% $CO_2$ and 2 to 4% $O_2$, balance nitrogen and/or helium.

We claim:

1. An electrode for pulsed gas lasers, which electrode comprises a metallic carrier and a surface layer consisting of a material which is different from the carrier material, characterized by the following combination of features:

The carrier (1) consists of a deeply drawable material, the surface layer (3) has an average thickness between 3 μm and 20 μm, and the surface layer (3) consists of one or more of the refractory metals tungsten, niobium, tantalum, rhenium and chromium and has a smaller work function and lower thermal and electrical conductivities than the material adjoining the underside of the surface layer (3).

2. An electrode according to claim 1, characterized in that the surface layer (3) has a thickness between 5 μm and 10 μm.

3. An electrode for pulsed gas lasers, comprising:
a metallic carrier and a surface layer consisting of a material which is different from the carrier material, said carrier consisting of a deeply drawable material, the surface layer having an average thickness between 3 mm and 20 mm, said surface layer consisting of one or more of the refractory metals tungsten, niobium, tantalum, and rhenium, and having a smaller work function and lower thermal and electrical conductivities than the material adjoining the underside of the surface layer, and
a metal interlayer disposed between said carrier and said surface layer, said interlayer having electrical and thermal conductivities higher than said surface layer.

4. An electrode according to claim 3, characterized in that the interlayer (2) has higher electrical and thermal conductivities than the carrier (1).

5. An electrode according to claim 3, characterized in that the interlayer (2) has a thickness of at least 5 μm.

6. An electrode according to claim 5, characterized in that the interlayer (2) has a thickness not in excess of 20 μm, preferably not in excess of 10 μm.

7. An electrode according to claim 3, characterized in that there is a gradual transition from the composition of the interlayer (2) to the composition of the surface layer (3).

8. An electrode according to claim 3, characterized in that the interlayer (2) consists of copper or aluminum.

9. An electrode according to claim 3, characterized in that the carrier (1) consists of copper, aluminum, brass, tin bronze or steel, particularly of a special steel.

10. An electrode according to claim 9, characterized in that the carrier (1) is a deeply drawn profiled member.

11. An electrode according to claim 3, characterized in that the refractory metals are present in the surface layer (3) as a homogeneous mixture or alloy.

12. A process of manufacturing an electrode for pulsed gas lasers, which electrode comprises a metallic carrier of a deeply drawable material and a surface layer consisting of a material which is different from the carrier material, the surface layer having an average thickness between 3 μm and 20 μm and consisting of one or more of the refractory metals tungsten, niobium, tantalum, rhenium and chromium and having a smaller work function and lower thermal and electrical conductivities than the material adjoining the underside of the surface layer, characterized in that the carrier (1) is formed by deep drawing in its final shape intended for the electrode,
the metal for the surface layer (3) is deposited by physical vapor deposition (PVD).

13. A process according to claim 12 for manufacturing an electrode in which an inter-layer made of a metal having higher electrical and thermal conductivities than the surface layer is disposed between the carrier and the surface layer, characterized in that the metal or metals for the interlayer (2) is or are also deposited by PVD.

14. A process according to claim 12, characterized in that the surface layer (3) is applied by magnetron sputtering.

15. A process according to claim 14, characterized in that the electrode while still in the PVD coating chamber is treated in such a gas atmosphere under the action of electric discharges, namely, in a low-pressure plasma, so as to form a passivating layer which contains the same components as that atmosphere in which the electrode is intended to be used in the laser or at least those of said components which are essential for the stabilization of the electrodes.

16. A process according to claim 15, characterized in that the passivating treatment is performed only until a passivating layer having an average thickness of 100 nm has been formed.

17. A process according to claim 16, characterized in that for use in $CO_2$ lasers the surface layer (3) consists of tungsten, niobium, tantalum or rhenium or one of their alloys and the passivation is effected under a $CO_2$ and/or $O_2$ atmosphere.

18. A process according to claim 15, characterized in that for use in CO lasers the surface layer (3) consists of tungsten, niobium, tantalum or rhenium or one of their alloys and the passivation is effected under a CO and/or $O_2$ atmosphere.

19. A process according to claim 15, characterized in that for use in $N_2$ lasers the surface layer (3) consists of tungsten, niobium, tantalum or rhenium or one of their alloys and the passivation is effected under an $N_2$ and/or $O_2$ atmosphere.

20. A process according to claim 15, characterized in that for use in Excimer chloride lasers the surface layer (2) consists of tungsten, chromium, tantalum or rhenium or one of their alloys and the passivation is effected under an HCl or $Cl_2$ atmosphere.

21. A process according to claim 15, characterized in that for use in Excimer fluoride lasers the surface layer (3) consists of niobium, chromium, tantalum or rhenium or one of its alloys and the passivation is effected under an HF or $F_2$ atmosphere.

22. A process according to claim 13, characterized in that the surface layer and the interlayer are applied by magnetron sputtering.

23. A process according to claim 12, characterized in that the electrode while still in the PVD coating chamber is treated in such a gas atmosphere under the action of electric discharges, namely, in a low-pressure plasma, so as to form a passivating layer which contains the same components as that atmosphere in which the electrode is intended to be used in the laser or at least those of said components which are essential for the stabilization of the electrodes.

24. A process according to claim 23, characterized in that the passivating treatment is performed only until a passivating layer having an average thickness of 100 μm has been formed.

25. An electrode for pulsed gas lasers, comprising:
a copper carrier consisting of a drawn material,
a surface layer disposed directly on said carrier and consisting of a material which is different from the carrier material, the surface layer having an average thickness between 3 mm and 20 mm, said surface layer consisting of one or more of the refractory metals tungsten, niobium, tantalum, and rhenium, and having a smaller work function and lower thermal and electrical conductivities than said carrier.

26. An electrode for pulsed gas lasers comprising:
a metallic carrier of a deeply drawable material;
a surface layer consisting of a material which is different from the carrier material, the surface layer having an average thickness between 3 micrometers and 20 micrometers and consisting of one or more of the refractory metals tungsten, niobium, tantalum, rhenium and chromium, and having a smaller work function and lower thermal and electrical conductivities than the material adjoining an underside of the surface layer; and a passivating layer formed in the surface layer, said passivating layer containing components that are the same as in an atmosphere in which the electrode is intended to be used in the laser or at least those of said components which are essential for the stabilization of the electrode.

27. An electrode according to claim 26, characterized in that the passivating layer has an average thickness of 100 nm.

28. An electrode according to claim 26, characterized in that for use in $CO_2$ lasers, the surface layer consists of tungsten, niobium, tantalum, or rhenium, or one of their alloys, and contains in its passivating layer components of a $CO_2$ and/or $O_2$ atmosphere.

29. An electrode according to claim 26, characterized in that for use in CO lasers, the surface layer consists of tungsten, niobium, tantalum, or rhenium, or one of their alloys, and contains in its passivating layer components of a CO and/or $O_2$ atmosphere.

30. An electrode according to claim 26, characterized in that for use in $N_2$ lasers, the surface layer consists of tungsten, niobium, tantalum, or rhenium, or one of their alloys, and contains in its passivating layer components of $N_2$ and/or $O_2$ atmosphere.

31. An electrode according to claim 26, characterized in that for use in Excimer chloride layers, the surface layer consists of tungsten, chromium, tantalum, or rhenium, or one of their alloys, and contains in its passivating layer components of an HCl or $Cl_2$ atmosphere.

32. An electrode according to claim 26, characterized in that for use in Excimer fluoride lasers, the surface layer consists of niobium, chromium, tantalum, or rhenium, or one of their alloys, and contains in its passivating layer components of an HF or $F_2$ atmosphere.

* * * * *